United States Patent Office 3,482,377
Patented Dec. 9, 1969

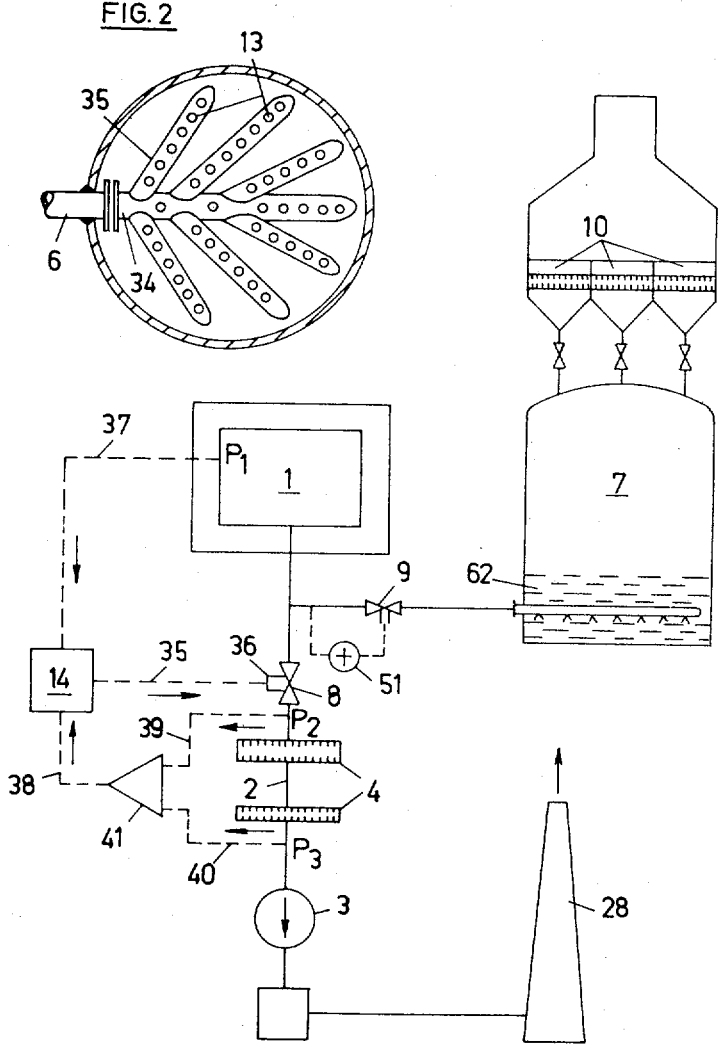

3,482,377
VENTILATION APPLIANCES FOR A PROCESSING CHAMBER
Wilhelmus K. A. Walrave, Bergen, North Holland, Netherlands, assignor to Reactor Centrum Nederland, The Hague, Netherlands, an institute of the Netherlands
Filed June 7, 1967, Ser. No. 644,285
Claims priority, application Netherlands, June 7, 1966, 6,607,856
Int. Cl. B01d 47/02
U.S. Cl. 55—255        7 Claims

ABSTRACT OF THE DISCLOSURE

Ventilation equipment for a processing chamber, such as a glove box or nuclear reactor containment vessel, comprising an exhaust duct which contains highly efficient but structurally delicate filters for removing contaminated particles from the exhaust gas. Protection against damage to the filters by a sudden pressure rise is provided by automatically closing off the exhaust duct upstream of the filters and bleeding the gas into a vessel containing a foam-forming liquid. Contact of the gas and vapor with the liquid tends to condense the vapor, to precipitate dispersed particles and to trap the gas in the form of foam bubbles.

---

This invention relates to ventilation systems for process chambers from which harmful gases or vapors may suddenly escape and in particular it relates to the use of filters in such systems and to the protection of the filters from damage by a sudden increase in the pressure differential across the filters.

Process chambers of the kind contemplated may consist, for example, of a "glove box" or other chamber of the kind in which tests or processing operations can be carried out under sealed conditions with, say, radioactive materials and substances.

It is also possible, however, for the processing chamber to be a chamber inside which a nuclear reactor is installed. In that case it is also denoted by the term "containment" or reactor chamber.

In both cases a situation may occur in which a quantity of gas or vapor that may be harmful to the environment suddenly escapes.

In the first-mentioned case release of gas or vapor occurs, for instance, when fissile elements which have served their purpose are opened by breaking the metal jacket which surrounds the nuclear fuel.

In the second case a nuclear reactor may show a so-called excursion in which a leak in the primary coolant circuit may cause radio-active gases and vapors to spread in the interior of the reactor chamber.

It has hitherto been the endeavor to protect the environment against escaping gases and vapors by passing the said gases and vapors through an exhaust duct containing filters having a very high collecting coefficient before the gases and vapors were discharged into the atmosphere. These filters, however, showed the drawback of being highly vulnerable, precisely because of the requirements stipulated for them in regard to a high collecting coefficient.

In many cases these filters, also termed absolute filters, are made of quite delicate fibers, e.g., paper.

Filters of this kind can in fact collect up to 99.98% of the particles that are passed through them of a size of, say, $3/10$ micron, but they may easily get damaged in case of a sudden pressure thrust in the gas mains connected to them, due to a sudden explosive development of gases and vapors as mentioned above.

According to the invention this drawback is overcome in the ventilation device described in that a connecting duct leading to a gas holder is connected to the exhaust duct at a point situated between the connection of the exhaust duct to the processing chamber and the vulnerable filter, the said filter being preceded by one or more valves which close automatically in the event of sudden increase of pressure in the processing chamber. The connecting duct terminates in an open end within the gas holder below the liquid surface of a solution of foam-forming substance contained in a gas holder.

Gases and vapors are introduced into the foam-forming solution in such a way that bubbles are formed, so that the harmful gases or vapors become encased in this solution in the course of foam formation. As a result of contact with the foam-forming liquid the vapors are quickly condensed to a large extent. In addition, the foam has a powerful decontaminating effect because of the fact that stationary gas or vapor is enclosed in the foam bubbles, and this promotes swelling of the bubbles and precipitation of any existing particles into the liquid.

The most suitable foam-formers are surface-active compounds which act as stable foam-formers. They may be solutions of soaps, particularly synthetic soaps, alkyl-aryl-sodium sulphonates such as dodecylbenzene, having a sulphonic acid group, polyphosphates, "T-pol" and foam-formers as used in foam-forming fire extinguishers, or mixtures of the said compounds. By "stable foam-former" is means here a substance causing the formation of a foam which is maintained for at least a few minutes.

If the gases to be dealt with contain iodine, one may use, for instance, an alkaline soap solution. In this way the iodine can be effectively removed.

The advantage of the ventilation device described lies not only in the fact that the filters are protected against being damaged as a result of a sudden pressure thrust, but an additional advantage is gained by the fact that the filter installation may be of a more simple construction.

In conventional filter installations it is a common practice to mount the filters in duplicate, so that after a pressure thrust they could at once be changed over to the spare filter installation. This spare filter installation is, for the reason stated, no longer necessary in the device now proposed.

One outstanding drawback of conventional ventilation devices, which are equipped with changeable or change-over filters, is that the filter which is in operation during the occurrence of a pressure surge does become damaged, and as a result a cloud of radio-active gases, vapor and material is afforded the opportunity of spreading over the environment, with all the harmful consequences which this entails. This is not only the case with the active material that is carried along with the pressure wave but also with the active material that has accumulated on the absolute filter in course of time (for example, in about one or two years).

Furthermore, the proposed device effects a saving in the installation costs of nuclear stations, because the so-called containment chamber may be constructed in a smaller form and hence more cheaply. This is due to the fact that the gas holder into which the foam-forming solution is introduced may be mounted outside the containment chamber. In addition, the chamber may be constructed with less compressive strength, because any pressure surge will be immediately relieved into the gas holder.

A further advantage of the ventilation device according to the present invention is that with this device there is no possibility of a partial vacuum being created after an explosion, whereas this may well occur in the case of reactor chambers equipped with systems which aim at maximum condensation of the escaping gases. Such partial vacuum is particularly dangerous to the reactor building, which as a rule is not strong enough to offer resistance to an external overpressure.

According to a further preferred embodiment of the invention one or more valves or frangible membranes are incorporated in the connecting duct, which valves open in the event of an increase of pressure in the processing chamber. This feature is particularly advantageous when several processing chambers are connected to one common gas holder containing a foam-forming solution. Should a gas explosion occur in one of these processing chambers the pressure wave can vent itself in the gas holder without any risk that the increase of pressure inside might cause an intrusion of foam-forming solution into the ventilation system of the other processing chambers.

The gas holder is preferably provided with at least one outlet, each outlet having an outlet filter. This has the advantage that the gas holder does not have to withstand high pressures and may herefore be of comparatively light construction.

The number of filters that need be connected to the gas holder is much smaller than the number of filters required in conventional installations where change-over filters are used. The conventional system was in fact tantamount to making all the filters of double construction, whereas in the system now proposed one need only connect to the gas holder a fraction of the filters in use as an additional safeguard.

It is expedient to form the downstream end of the connecting duct as a plurality of outlet apertures which are preferably directed downwardly so as to promote the formation of bubbles. The larger the number of apertures, the larger the resulting number of foam bubbles in which the gases can be enclosed without any appreciable pressures being needed for this storage. Since the outlet apertures are directed downwardly, the gases traverse the longest possible path through the solution, as they traverse the part of the solution that is below the outlet apertures twice: once in a downward direction and then in an upward direction.

According to a further preferred embodiment an automatic safeguard is provided which, depending upon the pressure $p_1$ in the processing chamber and/or upon the pressure difference $p_2-p_3$ over a filter in the exhaust, closes the valves provided in the exhaust duct. This is of particular importance if the valves are of such a construction that their closure has to be effected by means of servo-motors.

The invention will be further understood from the following detailed description taken with the drawings in which:

FIGURE 2 is a bottom view of the gas distributor in the gas holder of FIGURE 1;

FIGURE 3 is a diagrammatic representation of an automatic safeguard system for closing the valves in the chamber exhaust duct;

Figure 1:
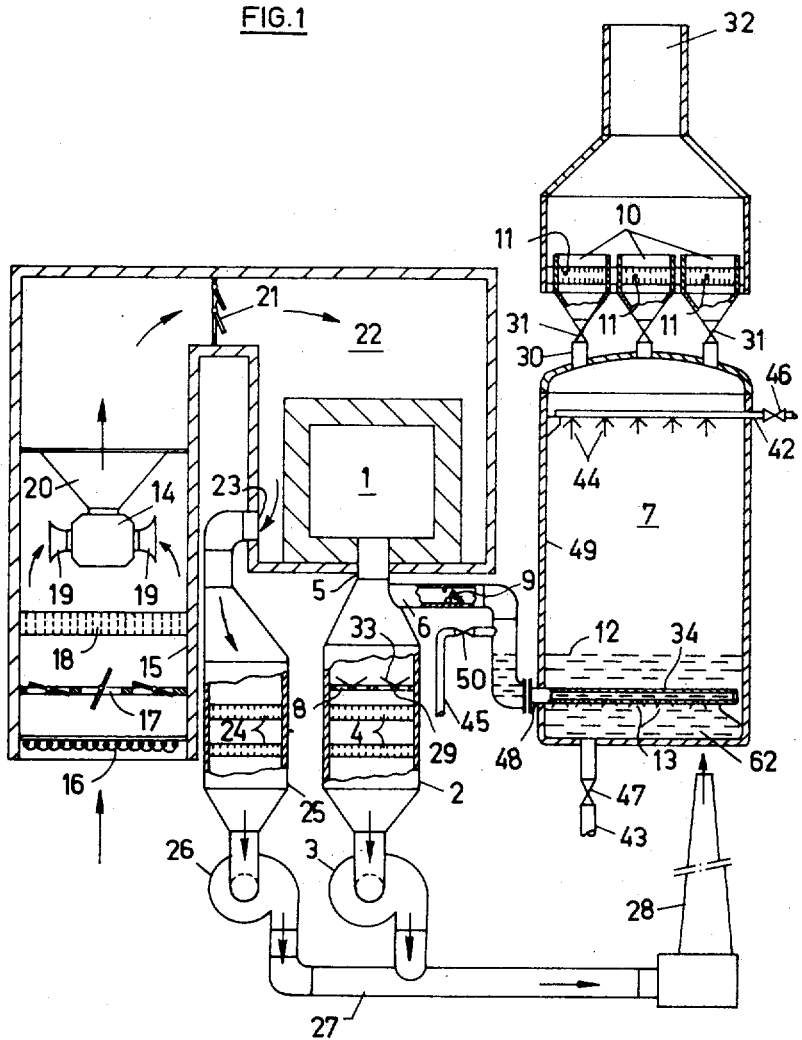
FIGURE 1 is a diagrammatic vertical sectional view of a ventilation device embodying the principles of the present invention.

Numberal 1 in FIGURE 1 represents one or more processing chambers only one of which is illustrated, as for instance a glove box, which processing chamber is connected on its underside at 5 to an outlet or exhaust duct 2 of the ventilation system; 14 is a pressure ventilator which draws in air from the atmosphere through duct 15. This air passes successively through grid 16, a set of shut-off devices 17 as well as a filter 18 before being supplied through inlet apertures 19 to ventilator 14. Through outlet 20 of ventilator 14 the purified atmospheric air finally passes via a shut-off system 21 into chamber 22 in which the glove box 1 is situated. The ventilator 14 maintains a slight overpressure in this chamber.

At 23 the air escapes from chamber 22 to pass via an absolute filter system 24 through duct 25 into a suction ventilator 26. Ventilator 26 carries the refiltered air away through a duct 27 to a chimney 28. The gases or vapors escaping from the processing chamber 1 are able, by passing through the duct 2 in which shut-off devices 8 and an absolute filter system 4 are incorporated, to reach a suction ventilator 3 which is likewise connected to outlet duct 27 and chimney 28.

The shut-off devices 8 are so constructed that they close automatically in the event of too high a difference in pressure across these devices. These shut-off devices may, for instance, be constructed with plate springs which can close against a grid 29.

To the side of the duct 2, at a position in front of the shut-off devices 8, a connecting duct 6 branches off and issues forth into a gas holder 7. The duct 6 ends in an outlet member 34 in which a number of outlet apertures 13 are provided. Numeral 12 indicates the level of a soap solution 62 which is contained in gas holder 7. At a position in front of the point of a passage 48 in the wall 49 of the gas holder 7, the duct 6 passes downward for some distance in such a manner that the soap solution does not penetrate into the remainder of the duct 6. Connected to this downward part of the duct 6 is a feed duct 45 provided with a shut-off valve 50. Through this duct a soap solution can be supplied to the gas holder 7. Situated at the top of gas holder 7 are a number of outlets 30 to which filters 11 are connected via connecting members 31. The outlet ducts 10 of these filters issue into a common outlet channel 32.

In the top part of the gas holder 7 there is a feed duct 42 provided with a shut-off valve 46. This feed duct, which may, if desired, be further branched, is provided with a number of spraying nozzles 44.

Situated in the bottom part of the gas holder at the lowest point of its bottom, is a flushing duct 43 in which a shut-off valve 47 is incorporated.

The operation of this installation is as follows:

As soon as gases or vapors in the processing chamber 1 escape with a sudden increase of pressure, the shut-off devices 8 close as a result of this increase of pressure. The plate springs 33 place themselves against the slits provided in the grid 29, as a result of which the absolute filters 4 are protected against this increase of pressure.

Through the duct 6 these gases and vapors can escape to the gas holder 7, in the course of which they bubble up through the soap solution 62 after having flowed through the outlet apertures 13. A large amount of foam develops in the gas holder 7, which foam heap contains the active gases. The gases that were already present in the gas holder 7, mostly air that has not been contaminated, are forced to the top of the foam heap. As the pressure in the gas holder 7 rises, this uncontaminated air will escape through the filters 11. The gas holder 7 should be designed in such a way that the heap of foam for all predictable cases never comes up so high as to reach the top of the gas holder. In view of this, the volume of the gas holder should bear a logical ratio to the delivery of the ventilation system and should, for instance, be so great that the volume is equal to the gas volume of the normal gas current which is supplied during a period of from 2 to 10 minutes. This prevents foam being carried along with the escaping uncontaminated air, with consequent clogging of filters 11.

After the explosive escape of harmful gases and vapors from the processing chamber 1 has ceased, the shut-off devices 31 are closed and the shut-off valve 47 is opened. After this a suitable spraying fluid 58 (see FIGURE 7) passing through the duct 42 via spraying nozzles 44 is directed onto the foam mass in the gas holder 7.

After the used-up soap solution and the foam mass treated with spraying liquid have been discharged through the flushing duct 43 to a waste-processing device not shown in the drawing, the gas holder 7 is flushed with air which has been cleaned by passage through a filter system, e.g. by connecting the duct 42 to the ventilator outlet 20.

The shut-off valve 47 is then closed and the valve 50 opened in order to supply a quantity of fresh soap solution to the gas holder 7. After this the shutoff valves 50 and 46 are closed and the shut-off devices 31 are opened. The gas holder 7 is now again ready for service.

If several processing chambers 1 are connected to the gas holder 7, it is advisable to incorporate in the duct 6 a valve 9 or a tearable membrane which opens in the event of an increase of pressure in the processing chamber 1. A one-way, normally-closed, spring-loaded valve may be used for this purpose. In this way, in case of an explosion in one processing chamber, contamination is prevented from spreading to the other processing chambers as a result of the increase of pressure in gas holder 7.

FIGURE 2 shows, in a bottom view facing the gas outlet or distributor member 34, how this member is branched into a plurality of offshoot members 35. As shown by the figure, the apertures 13 through which the gases and vapors can blow out into the soap solution are situated along all the offshoot members. It goes without saying that many other configurations of these distribution members are possible without deviating from the invention.

FIGURE 3 shows diagrammatically how the valves or shut-off devices 8 which are provided in the outlet duct 2 can be closed by means of a controlled servo-motor. For this purpose an automatic safeguard 14 is provided which, depending upon the pressure $p_1$ in the processing space or upon the difference in pressure $p_2-p_3$ over filter 4, sends controlling impulses via an impulse duct 35 to a servo-motor 36 for the shut-off devices 8. In this figure, numerals 37 and 38 represent diagrammatically the impulse duct along which the measuring impulse of pressure $p_1$ or the difference in pressure $p_2-p_3$ is transmitted to the controlling apparatus 14; 39 and 40 are impulse ducts along which the measuring impulses which are a measure for the value of pressure $p_2$ and $p_3$ are supplied to a controlling apparatus 41 which subtracts these measured values from each other.

Figure 4:
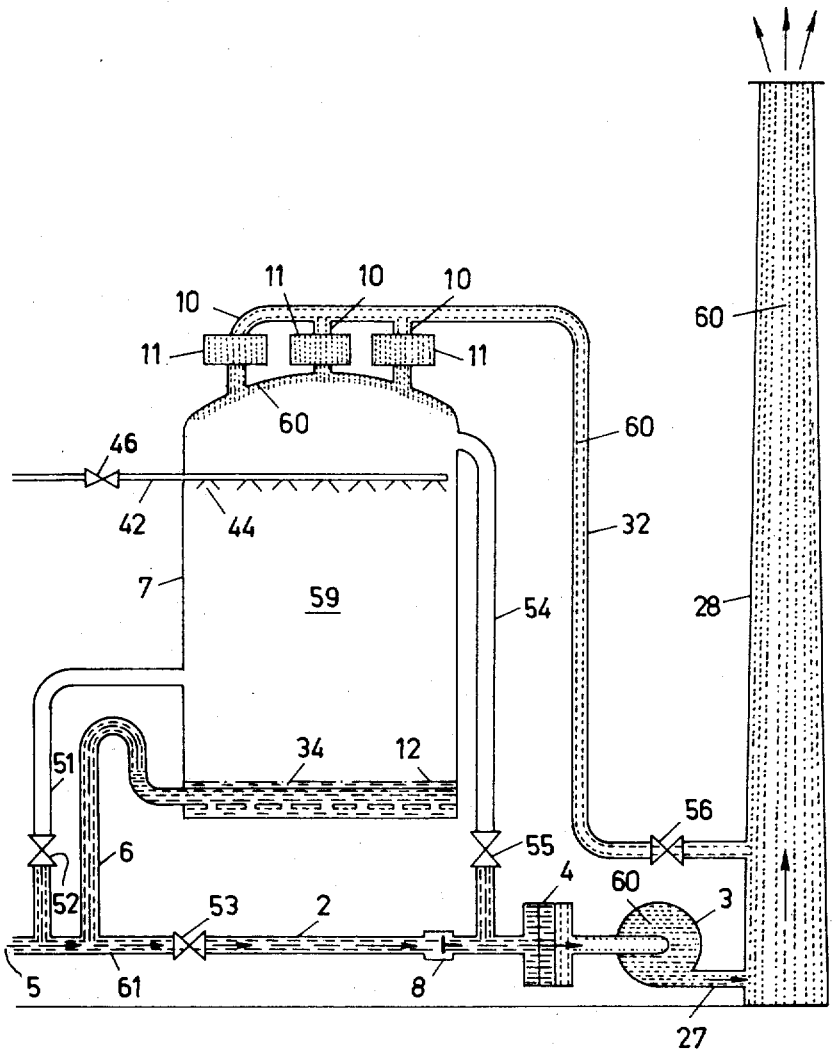
FIGURE 4 is a schematic view of the gas holder during a normal working situation.

FIGURE 4 represents a gas holder as seen during the normal working situation. According to the embodiment illustrated in this figure, the outlet duct 27 as well as the outlet channel 32 now issue into the same chimney 28. Positioned parallel to the connecting duct 6 is a filling duct 51 in which a shut-off valve 52 is incorporated. Under normal conditions the shut-off valve 52 is closed. The filling duct 51 connects the upstream portion of the duct 2 with the gas chamber of gas holder 7. The top of the gas holder 7 is connected by means of a flushing duct 54 with the part of duct 2 that is situated between shut-off device 8 and absolute filter 4. A shutoff valve 55 is incorporated in the flushing duct. Under normal circumstances this shut-off duct 55 is closed. Furthermore, a shut-off valve 53 is incorporated in the duct 2 after the branch-off of connecting duct 6 and before shut-off devices 8. Under normal circumstances this shut-off valve is open. Similarly, a shut-off valve 56 is incorporated in the outlet channel 32, which valve is likewise open under normal circumstances.

In the major part of the gas chamber of gas holder 7 there is now still a remnant of air 59 which was left after a flushing process with air which was carried out before the gas holder was put into service. Through the open shut-off valve 56, duct 32 and filter 11, purified gas 60 can penetrate into the upper part of the gas holder 7.

Figure 5:
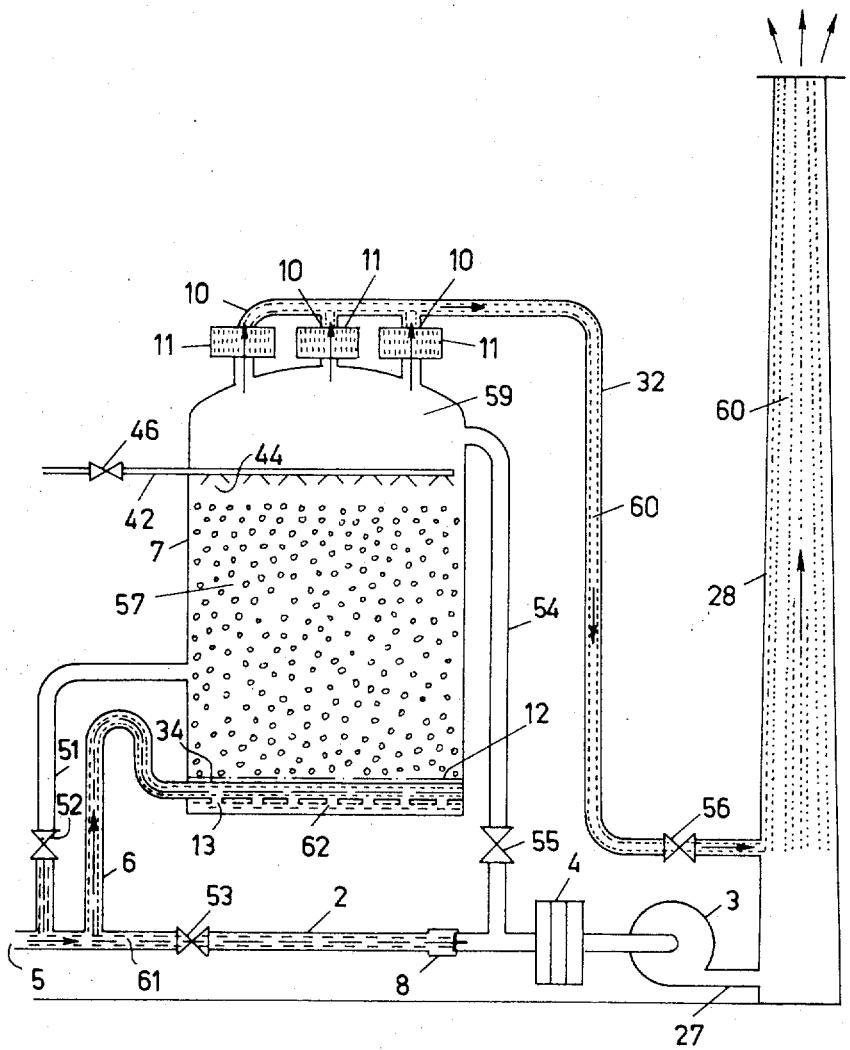
FIGURE 5 is a schematic view of the gas holder during a pressure wave.

FIGURE 5 illustrates the flow of the gases and the formation of foam 57 during the occurrence of a pressure wave. The shut-off device 8 is now closed. The position of the other shut-off devices is as already explained in connection with FIGURE 4. The major part of the air that was in gas holder 7 has now flowed away, via the filter 11, through the duct 32 to the chimney 28 as a purified gas 60.

The system is suitable for the storage of gases which cannot be filtered, as for instance rare gases.

When capsules are opened in which, for instance, air has been irradiated, a similar rise in activity of unfilterable gases can clearly be measured. During such a period one can therefore lead the entire delivery of the ventilation system via the gas holder and collect in the latter the major portion of these gases. A period of this kind may therefore not exceed a time of from 2–10 minutes, unless opportunity is afforded for locally drawing off these gates via a separate minor duct and leading them more directly to the gas holder.

If the gases contain particularly short-lived isotopes a cooling period of a few days or even a few weeks is quite permissible for reducing this quantity of activity to a reasonable level.

Once it has been decided to flush the radioactive gases, this can be done via the gas holder in such a way that the concentration, i.e. the quantity of radioactivity that is discharged daily, can be accurately controlled. Moreover, these gases can then be flushed under optimum atmospheric conditions.

Figure 6:
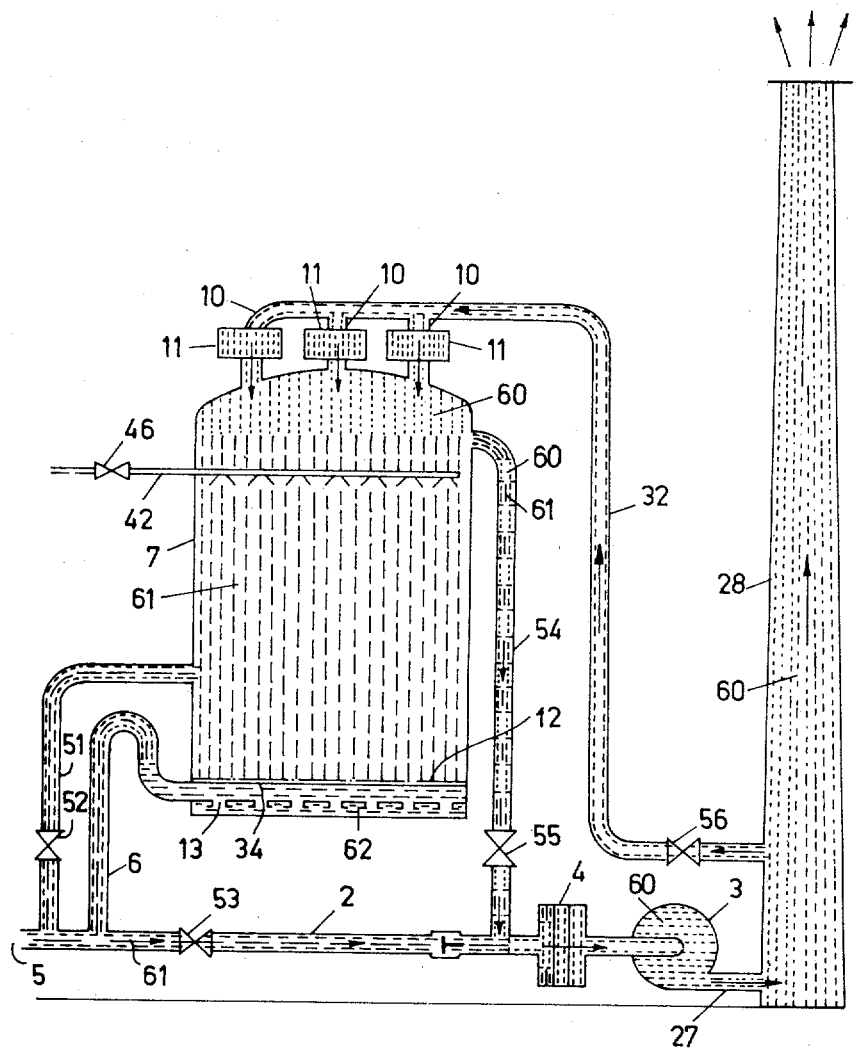
FIGURE 6 is a schematic view showing the filling of the gas holder and the facility for washing the gas with liquid.

FIGURE 6 illustrates how controlled flushing is carried out:

The shut-off valve 52 is closed. As hitherto, the shut-off valve 53 remains open, so that the current of gas to be discharged from the chamber at 5, passing without obstruction through the absolute filters 4, can reach the chimney 28.

The shut-off valves 55 and 56 are now partly opened. Under the influence of the difference in pressure created by the suction ventilator 3, a flushing current of purified gas 60 coming from chimney 28 is now set up, which finally again reaches chimney 28 by the path 28–56–32–10–11–7–54–55–4–3–27. This flushing current carries with it the active gas 61 from the gas holder 7, to discharge it via 54–55–4–3–27, this gas being purified at the same time.

Figure 7:
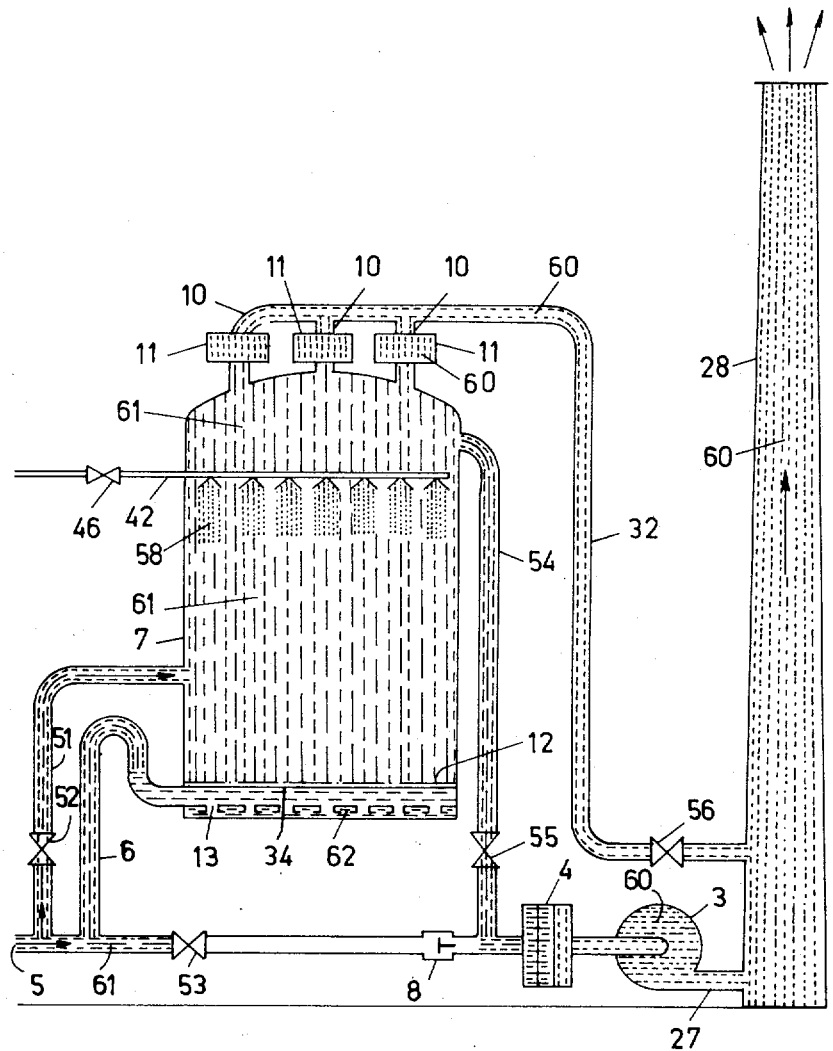
FIGURE 7 is a schematic view showing the controlled flushing of the gas holder.

If the gas is passed through the gas holder while being sprayed with a suitable chemical detergent 58, the gas holder may be used as a washing column, so that in this way an additional decontamination of the ventilation system is achieved. This is illustrated in FIGURE 7. Here, the shut-off valves 53 and 56 are closed, and the shut-off valve 52 is open. As the shut-off valve 46 in the feed duct 42 is also open, the gas in the gas holder 7 is subjected to intense decontamination under the action of the sprayers 44. Passing via the duct 54, this gas then also passes through the absolute filters 4 before being removed through the chimney 28.

The ventilation device described is very well adapted for use, for instance, at research centers. For this purpose it will in many cases be found sufficient to have one central gas holder 7 only, to which all the available processing chambers can be connected.

In such a case it may also be advantageous to make the gas holder of the expansible type. A convenient embodiment of the gas holder which may be selected for this purpose is the one illustrated in FIGURE 1, equipped with its own outlet pipe 32. For 42 a pliant connecting duct (not shown in the drawing) should in this case be provided, or else the wall passage of 42, with a vertical duct portion fitted inside gas holder 7, may be transferred to the bottom, stationary part of gas holder 7 (not illustrated). Articulated joints known per se are provided in wall 49, between which there are channels filled with a sealing liquid (not illustrated). As there is a pressure of not more than about 30 cm. column of water in gas holder 7, the said channels need only be dimensioned slightly higher than the said 30 cm.

Should one wish to make the gas holder expansible with the construction represented in FIGURE 4, the articulated joints may be made to telescope and be provided with the aforementioned channels filled with sealing liquid.

Also, the possibility is afforded of leading ducts 10 or 32 together with ducts 51, 54 and 42 inside gas holder 7 downwards through the bottom of gas holder 7 (not illustrated). According to this variant it is not only possible to mount filters 11 at an easily accessible position, but it will now also be practicable to make the gas holder wall 7 consist of one piece of coherent, loosely pliable material that is impermeable to gas. When not in use this material may be draped in suitable folds over a grid. This grid may be fixed to the bottom of gas holder 7 (not illustrated). The outer edge of the said material should in that case be joined gas-tight to the erect border of the said bottom. This border must extend higher than the liquid lever 12. As soon as gas enters the gas holder 7, the said material will become inflated like a balloon. For protection against weather conditions, for instance, such balloon may be placed in an enveloping protective structure. This protective structure need not be gas-tight. If one has to deal with materials which would render the inner wall of gas holder 7 difficult to decontaminate, the balloon material may, after contamination, be replaced by fresh material.

What is claimed is:

1. In a ventilation device for at least one processing chamber from which gases or vapors harmful to the environment may suddenly escape, said device including an exhaust duct having an upstream end for receiving gases and vapors from the chamber, a suction ventilator connected to said exhaust duct and at least one filter in said exhaust duct, the improvement comprising a vessel adapted to hold a mass of gas, a foam-forming liquid in said vessel, a connecting duct connected at one end to said exhaust duct at a point between said upstream end thereof and said filter and communicating through its other end with said vessel at a point below the level of said foam-forming liquid, and means automatically responsive to a sudden pressure increase in said exhaust duct for closing off said exhaust duct upstream of said filter.

2. A ventilation device as in claim 1 including means normally closing said connecting duct and operable to open in the event of an increase of pressure in the processing chamber.

3. A ventilation device as in claim 1 wherein said vessel is provided with at least one outlet having an outlet filter.

4. A ventilation device as in claim 1 wherein said other end of said connecting duct is branched off into a plurality of outlet apertures which are directed downwardly.

5. A ventilation device as in claim 1 wherein said means for closing off said exhaust duct includes power-operated valves and a pressure-responsive control system for opening and closing said valves.

6. A ventilation device as in claim 1 wherein said vessel is expansible.

7. A ventilation device as in claim 6 wherein the wall of said vessel is composed of gas-tight, pliable material which is interchangeably fixed to an erect border of the bottom of said vessel, which material under normal conditions rests on a fixed supporting grid positioned above the liquid level.

References Cited

UNITED STATES PATENTS

| | | | |
|---|---|---|---|
| 1,824,713 | 9/1931 | Fisher et al. | 55—255 |
| 2,070,578 | 2/1937 | Bowman | 55—256 X |
| 2,680,451 | 6/1954 | Hill | 55—420 X |
| 2,729,301 | 1/1956 | Ekstrom | 55—314 X |
| 3,056,662 | 10/1962 | Ridgway | 23—288 |
| 3,075,448 | 1/1963 | Cohen | 137—461 X |
| 3,121,384 | 2/1964 | Brode | 98—119 |
| 3,129,648 | 4/1964 | Hoff. | |
| 3,225,526 | 12/1965 | Bayles et al. | 55—420 |
| 3,320,969 | 5/1967 | Gordon | 137—312 |
| 3,377,058 | 4/1968 | Panzica | 266—15 |

FOREIGN PATENTS

| | | |
|---|---|---|
| 411,214 | 3/1925 | Germany. |
| 554,358 | 6/1943 | Great Britain. |

OTHER REFERENCES

Nuclear Merchant Ship Reactor Final Safeguards Report, Environmental Analysis of NS "Savannah" Operation at Camden, USAEC Report ORNL, 2867 (Rev.), Oak Ridge National Laboratory, Jan. 24, 1961, pages 9–11.

HARRY B. THORNTON, Primary Examiner

DENNIS E. TALBERT, Jr., Assistant Examiner

U.S. Cl. X.R.

55—256, 259, 309, 385, 418, 482; 98—1, 43; 137—312, 461; 176—37; 261—22, 124